United States Patent
Weng et al.

(10) Patent No.: US 10,311,869 B2
(45) Date of Patent: Jun. 4, 2019

(54) METHOD AND SYSTEM FOR AUTOMATION OF RESPONSE SELECTION AND COMPOSITION IN DIALOG SYSTEMS

(71) Applicant: Robert Bosch GmbH, Stuttgart (DE)

(72) Inventors: Fuliang Weng, Mountain View, CA (US); Zhongnan Shen, Milpitas, CA (US)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 15/507,374

(22) PCT Filed: Oct. 21, 2015

(86) PCT No.: PCT/US2015/056687
§ 371 (c)(1),
(2) Date: Feb. 28, 2017

(87) PCT Pub. No.: WO2016/065020
PCT Pub. Date: Apr. 28, 2016

(65) Prior Publication Data
US 2018/0240459 A1    Aug. 23, 2018

Related U.S. Application Data

(60) Provisional application No. 62/066,508, filed on Oct. 21, 2014.

(51) Int. Cl.
*G10L 15/00* (2013.01)
*G10L 15/22* (2006.01)
(Continued)

(52) U.S. Cl.
CPC .............. *G10L 15/22* (2013.01); *G06F 3/015* (2013.01); *G06F 3/167* (2013.01);
(Continued)

(58) Field of Classification Search
CPC ....... G10L 15/22; G10L 15/26; G10L 15/265; G10L 15/30; G10L 17/22; G10L 13/033;
(Continued)

(56) References Cited

U.S. PATENT DOCUMENTS 6,334,103 B1 * 12/2001 Surace .................. G10L 13/033
704/257
7,058,577 B2 * 6/2006 Surace .................. G10L 13/033
704/243
(Continued)

FOREIGN PATENT DOCUMENTS

| GB | 2480521 A | 11/2011 |
|---|---|---|
| WO | 2008098039 A1 | 8/2008 |
| WO | 2012/135226 A1 | 10/2012 |

OTHER PUBLICATIONS

Extended European Search Report corresponding to European Application No. 15852028.8, dated Jun. 6, 2018 (10 pages).
(Continued)

*Primary Examiner* — Edgar X Guerra-Erazo
(74) *Attorney, Agent, or Firm* — Maginot Moore & Beck LLP

(57) ABSTRACT

A dialog system includes a processor. The system can further include a dialog manager. The dialog manager can be configured to receive input from a user using the processor. The system can further include a user category classification and detection module, which is configured to identify categories for the user from the received input. The system can further include a user mood detection and tracking module configured to identify a mood of the user. The system can further include a user physical and mind state and energy level detection module configured to identify a mental status of the user. The system can further include a user acquaintance module configured to identify an acquaintance status of the user. The system can further include user personality
(Continued)

detection and tracking module configured to identify a personality status of the user. The system can further include a conversational context detection and response generation module.

10 Claims, 2 Drawing Sheets

(51) Int. Cl.
| | |
|---|---|
| G06F 16/9032 | (2019.01) |
| G06F 3/01 | (2006.01) |
| G06K 9/00 | (2006.01) |
| G06F 3/16 | (2006.01) |
| G06F 17/27 | (2006.01) |
| G06N 5/02 | (2006.01) |
| G10L 13/033 | (2013.01) |
| G10L 13/10 | (2013.01) |
| G10L 15/26 | (2006.01) |
| G10L 25/63 | (2013.01) |
| H04L 29/08 | (2006.01) |

(52) U.S. Cl.
CPC .... *G06F 16/90332* (2019.01); *G06F 17/2735* (2013.01); *G06K 9/00295* (2013.01); *G06K 9/00302* (2013.01); *G06N 5/02* (2013.01); *G10L 13/033* (2013.01); *G10L 13/10* (2013.01); *G10L 15/26* (2013.01); *G10L 25/63* (2013.01); *H04L 67/22* (2013.01); *G06K 2209/27* (2013.01)

(58) Field of Classification Search
CPC ............... G10L 2015/228; G10L 13/10; G10L 2015/225; G10L 15/00; G10L 21/0364; G10L 2021/0135; G10L 25/00; G06F 3/167
See application file for complete search history.

(56) References Cited

U.S. PATENT DOCUMENTS

| | | | | |
|---|---|---|---|---|
| 7,224,790 | B1 * | 5/2007 | Bushey | H04M 3/5232 379/265.13 |
| 7,266,499 | B2 * | 9/2007 | Surace | G10L 13/033 704/270 |
| 7,684,990 | B2 * | 3/2010 | Caskey | G10L 15/22 704/255 |
| 7,933,389 | B2 * | 4/2011 | Kumar | H04M 3/42153 379/68 |
| 8,433,572 | B2 * | 4/2013 | Caskey | G10L 15/22 704/10 |
| 8,473,618 | B2 * | 6/2013 | Spear | H04L 65/1066 709/227 |
| 9,055,147 | B2 * | 6/2015 | Surace | G10L 13/033 |
| 9,634,855 | B2 * | 4/2017 | Poltorak | G10L 13/033 |
| 9,990,176 | B1 * | 6/2018 | Gray | G06F 3/167 |
| 2002/0198707 | A1 | 12/2002 | Zhou | |
| 2005/0091056 | A1 * | 4/2005 | Surace | G10L 13/033 704/270.1 |
| 2006/0106612 | A1 * | 5/2006 | Surace | G10L 13/033 704/270 |
| 2008/0096533 | A1 | 4/2008 | Manfredi et al. | |
| 2008/0103777 | A1 * | 5/2008 | Surace | G10L 13/033 704/270 |
| 2008/0144783 | A1 * | 6/2008 | Kumar | H04M 3/42153 379/88.13 |
| 2009/0234655 | A1 | 9/2009 | Kwon | |
| 2011/0283190 | A1 * | 11/2011 | Poltorak | G10L 13/033 715/716 |
| 2012/0046948 | A1 * | 2/2012 | Leddy | G10L 13/033 704/260 |
| 2012/0330660 | A1 | 12/2012 | Jaiswal | |
| 2014/0191939 | A1 | 7/2014 | Penn et al. | |
| 2014/0198956 | A1 | 7/2014 | Forutanpour et al. | |
| 2017/0221483 | A1 * | 8/2017 | Poltorak | G10L 13/033 |
| 2017/0221484 | A1 * | 8/2017 | Poltorak | G10L 13/033 |

OTHER PUBLICATIONS

International Search Report and Written Opinion corresponding to PCT Application No. PCT/US2015/056687, dated Apr. 14, 2016 (12 pages).

\* cited by examiner

METHOD AND SYSTEM FOR AUTOMATION OF RESPONSE SELECTION AND COMPOSITION IN DIALOG SYSTEMS

CROSS-REFERENCE TO RELATED APPLICATIONS

This application is a 35 U.S.C. § 371 National Stage Application of PCT/US2015/56687, entitled "METHOD AND SYSTEM FOR AUTOMATION OF RESPONSE SELECTION AND COMPOSITION IN DIALOG SYSTEMS" by Weng et al., filed Oct. 21, 2015, which claims the benefit of priority to U.S. Provisional Application Ser. No. 62/066,508 entitled "METHOD AND SYSTEM FOR AUTOMATION OF RESPONSE SELECTION AND COMPOSITION IN DIALOG SYSTEMS" by Weng et al., filed Oct. 21, 2014, the disclosures of which are hereby incorporated herein by reference in their entirety.

TECHNICAL FIELD

This disclosure relates generally to communication systems, more particularly, to voice communication systems.

BACKGROUND

An increasing number of devices are entering into people's life, for example, at home, on the go, or in the office. When people perform primary tasks, such as cooking, driving, or writing, they may want to work on other tasks, for example, adjusting room temperature, turning on/off indoor or outdoor lights, listening to the news, or checking who is at the door front, or controlling the garage door. Communication systems such as voice communication systems can be used in settings such as when human hands are not able to easily reach the buttons, knobs, or touch screens. Certain existing systems, such as Siri, are increasing the awareness of communication technologies to the general public.

However, such existing systems as those described above have several limitations. For example, the existing systems may not take into consideration rich expressive nature of human languages and the expressions used in these systems may not take into consideration how or which expressions are used for the different user groups in different contexts and with different use purposes. Thus, certain existing systems may use a one-size-fits all approach. As a result, a large percentage of users may not enjoy the use of such systems. There exists a need for a system that can address the shortcomings of the existing systems.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to a person of ordinary skill in the art to which this document pertains.

In the following description, for purposes of explanation, numerous specific details are set forth in order to provide a thorough understanding of one or more aspects. However, it may be evident that such aspects may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Figure 1:
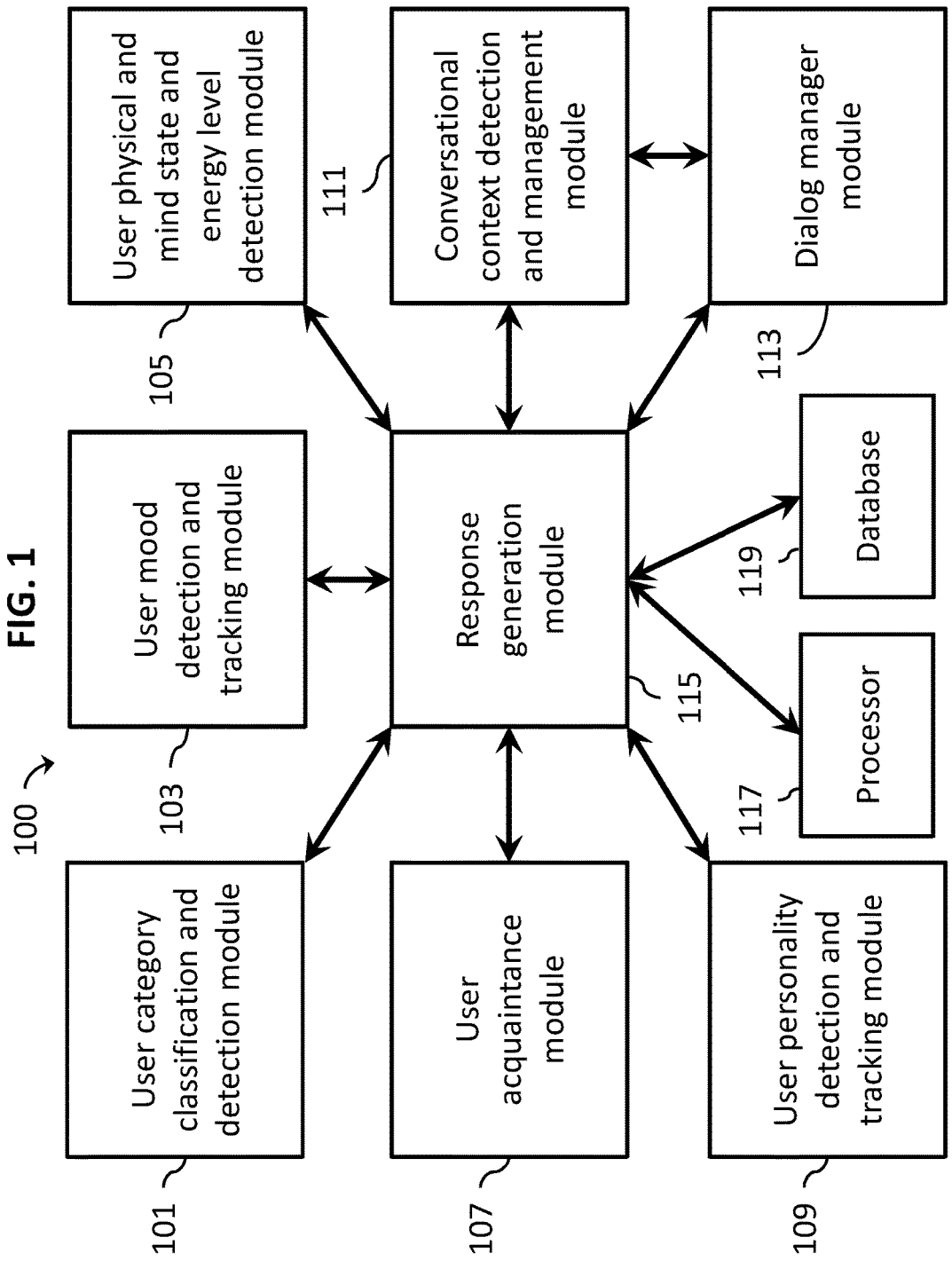
FIG. 1 illustrates a functional block diagram of an exemplary embodiment of a system according to the disclosed subject matter.

FIG. 1 illustrates a functional block diagram of an exemplary embodiment of a system 100. The system 100 can be a dialog system with details concerning system responses under different conditions. Other components of a typical intelligent dialog system may be used, which are described, for example, in U.S. Pat. No. 7,716,056 and U.S. Published Patent Application No. 2014/0019522, the entire disclosures of which are incorporated by reference herein. In one exemplary embodiment, the system 100 includes a user category classification and detection module 101, a user mood detection and tracking module 103, a user physical and mind state and energy level detection module 105, a user acquaintance module 107, a user personality detection and tracking module 109, a conversational context detection and management module 111, and a dialog manager module 113. The system 100 also includes a response generation module 115. The system 100 can additionally include a processor 117 and a database 119. In one embodiment, each of these modules 101, 103, 105, 107, 109, 111, 113, 115, processor 117, and database 119 in the system 100 can be configured to directly interface with each other. In another embodiment, a different combination of the modules 101, 103, 105, 107, 109, 111, 113, 115, processor 117, and database 119 in the system 100 can be configured to directly interface with each other.

In one embodiment, the processor 117 can include, but is not limited to, a central processing unit (CPU), an application specific integrated circuit (ASIC), a field programmable gate array (FPGA) device, or a micro-controller. The system 100 can further include a memory. The memory may be incorporated in the database 119. In another embodiment, the memory is a separate module from the database. The processor 117 is configured to execute or perform programmed instructions that are stored in the memory. The memory can be any suitable type of memory, including solid state memory, magnetic memory, or optical memory, just to name a few, and can be implemented in a single device or distributed across multiple devices. The programmed instructions stored in memory include instructions for implementing various functionality in the system 100, including the various modules 101, 103, 105, 107, 109, 111, 113, 115 and the database 119 described herein.

In one example, the system 100 can incorporate rich expressive characteristics in the responses of the speech dialog systems. Specifically, the system 100 can use information such as, but not limited to, categories of age, gender and professional user groups, and the relationship within concerned user groups (such as family member relations, team organizational structures), categories of user moods, types of contextual information related to communication needs (such as conversational context, environmental context), ontological relations of these entities, groups, states and information, genres of language to be selected for different families and contexts, and categories of prosodic marks, or the like. In one example, the system 100 can be configured to select output sentences from the system 100 based on this information and annotate with corresponding prosodic and emotion marks. Additionally or alternatively, the system 100 can also include different processes configured to select the expressions depending upon the system's needs 100. In one example, a number of example application domains can be covered, such as home device controls, sports news selection, information inquiry, mobility assistance, customer support, or the like. In another example, the system 100 can also use multiple aspects of the user, multiple aspects of the context, and multiple aspects of the language to construct or synthesize responses. In another example, the system 100 can identify and refine candidate responses with different conditions from various data sources for response construction.

In one exemplary embodiment, the user category classification and detection module 101 can be configured to classify and detect user categories. For example, users can be classified into different categories along different dimensions, such as age, gender, profession, and relationship. In one example, the system 100 can obtain information about the user through processes such as a user enrollment process at the time when the user starts to use the system 100. In another example, the system 100 can obtain information about the user dynamically through explicit or implicit interaction with the user. For example, the system 100 may detect the user's age group via the voice of the user, or via video of the person's face. In another example, system 100 may also ask the user after it performs an action requested by the user.

With further reference to FIG. 1, the user category classification and detection module 101 can classify users based on the user's age. In one example, user category classification and detection module 101 can identify whether the user is a child, a teenager, an adult, or a senior. The information about the age of the user can be collected, for example, during a user enrollment process and a system acquaintance process from the user based on the user's speech and the system 100. In another example, speech-based age detection can also be used to identify information about the age of the user.

With further reference to FIG. 1, the user category classification and detection module 101 can classify users based on the user's gender. The information about the gender of the user can be collected, for example, during a user enrollment process and a system acquaintance process from the user based on the user's speech and the system 100. In another example, speech-based age detection can also be used to identify information about the age of the user.

With further reference to FIG. 1, the user category classification and detection module 101 can classify users based on the user's profession. Examples of classification of user's profession can include, but is not limited to, engineer, scientist, banker, teacher, factory worker, farmer, government employee, soldier, or the like. The information about the profession of the user can be collected, for example, during a user enrollment process and a system acquaintance process from the user based on the user's speech and the system 100.

With further reference to FIG. 1, the user category classification and detection module 101 can classify users based on the user's relationship with other users of the system 100, members of an organization where the system 100 is used, or the like. Examples of classification of user's relationship can include, but is not limited to, family, co-worker, manager vs. team members, or the like. The information about the relationship of the user can be collected, for example, during a user enrollment process and a system acquaintance process from the user based on the user's speech and the system 100.

With further reference to FIG. 1, the user mood detection and tracking module 103 can be configured to detect and track the user's mood. In one example, the user's mood can be registered with the dialog manager module 113 in each dialog turn. Examples of user's mood can include, but is not limited to happy, angry, sad, neutral, or the like. The user's mood can be encoded as an emotion indicator. In one example, the user's mood can be detected via the characteristics of the user's voice or a video of the user's facial expression when the user communicates with the system 100. The user's voice can be an acoustic signal and the video of the user can be a video stream.

With further reference to FIG. 1, the user physical and mind state and energy level detection module 105 can detect and identify the user's physical and mental state and energy level. In one example, the user's physical and mental state and energy level can include, but is not limited to, whether the user is sleepy, whether the user just woke up, whether the user is tired, whether the user is energetic, whether the user is performing other tasks at the same time, whether the user interacts the system 101 as his/her primary task or pays enough attention in talking to the system, or the like. In one example, the user's physical and mental state and energy level can be detected and identified from the energy level of user voice, the talking tones of the user, and sounds in the user's speech. This information can be detected and registered in the system 100. In another example, the user's physical and mental state and energy level can also be detected and identified from the explicit statement from the user. For example, if the user says "I am tired" or "I need to go to bed," the user physical and mind state and energy level detection module 105 can detect that the user is tired. In yet another example, the user physical and mental state and energy level can be detected by wearable devices on the user, either embedded in the body or attached on the person, and transmitted to the system 100. Examples of such wearable devices include, but are not limited to, electromyography (EMG) for muscle activity detection and interpretation, electroencephalography (EEG), near-infrared spectroscopy (NIRS) for brain activity and interpretation, or the like. In another example, the user's physical and mental state and energy level can be stored, for example, in the database 119 of the system 100 and can be used by the system 100 to predict the user's physical and mental state and energy level, user's mood, or the like.

With further reference to FIG. 1, the user's acquaintance module 107 can be used to accumulate user's usage of the system 100. In one example, the user's acquaintance module 107 can be used to estimate whether the user is familiar with the system 100. In another example, the user's acquaintance module 107 can be used to identify the level at which the users know other users or speakers, such as whether the users are having a first time encounter, the users have had a short time acquaintance or a long time close friend relationship. In another example, the system 100 can remember if the user's has used the system 100 for the first time, the length of time the user has used the system 100, the frequency with which the user uses the system 100, and the features of the system 100 that the user uses. Statistics can be accumulated in the system 100 to compute a value of the acquaintance. Such statistics may also record inter-user interaction such as how often users, for example, two users, send messages to each other, over what period of times, and what messages they exchange. Such statistics may also record how often two specific users use the same system at the roughly the same time. These statistics are then used to estimate the familiarity and closeness of the users. The user's acquaintance module 107 can have a time factor that can reduce the user's familiarity score based on the duration that user does not use the system 100. Furthermore, certain statistics can be disabled by the users either during the initial enrollment phase or during the interaction with the system 100.

With further reference to FIG. 1, the user's personality detection and tracking module 109 can be used to detect the user's personality. In one example, this information can be detected based on information collected from the user's interaction with the system 100. A user's personality can be classified as along several aspects, for example, humor vs. procedural, quiet vs. talkative, as well as a fast, medium, and slow pace, or the like. In another example, the user's personality detection and tracking module 109 can use values to calculate the scores about speaker's personality. Examples of values the user's personality detection and tracking module 109 can use include, but are not limited to, speaking rate, utterance length, number of utterances for a task request, fun words in the utterances, or the like.

With further reference to FIG. 1, the conversational context detection and management module 111 can be configured to compute and administer a number of values. In another example, the conversational context detection and management module 111 can be configured to collect statistics for these aspects. For example, the aspects can include, but are not limited to, interaction setting such as family setting, business setting, casual setting, or the like. In one example, the values can be computed during the user's initial enrollment period and during subsequent uses. In one example, information about the user's relationship can place a higher weight in identifying the value of the interaction setting. In one example, based on the values from the conversational context detection and management module 111, the response generation module 115 may generate a response based on a genre of expressions that is, for example, "formal", "informal", "very casual," or the like.

With further reference to FIG. 1, another example of a value the conversational context detection and management module 111 can be configured to compute the response urgency or pace, such as high, medium, low. In one example, this value can be computed using the pace of the user's speech or can be explicitly requested from the user during the interaction with the system 100. In another example, the response urgency can be estimated or conveyed by the results obtained during the interaction with the system. If the next train departs in 20 minutes when the user queries about the train schedule for his/her trip, the system 111 would indicate high urgency so that the user can get ready quickly. If an immediate turn is needed within next 10 meters, the response needs to catch user's attention so that he/she can be ready for the move. The response of the urgency can be reflected by the selection of the lexicon or words, such as "soon" or "quickly", and/or by a speaking tone or speaking rate, or even a specifically designated sound, or the like. In one example, based on the values from the conversational context detection and management module 11, the response generation module 115 may generate short, medium, or elaborate expressions for communication with the user. In another example, the exact wording generated by the response generation module 115 can also depend on different information on the user from the different modules 101, 103, 105, 107, 109, 111, and 113.

With further reference to FIG. 1, another example of a value the conversational context detection and management module 111 can be configured to compute the operation time such as operating the system 100 in the morning, during day time, meal time, or right before bed, relative to the user's scheduled events. In one example, this value can be selected based on the clock in the system 100 or an adaptation from the use of the system 100. In another example, this value may also be adjusted by the user explicitly via the dialog manager module 113. In one example, different expressions can be generated by the response generation module 115 at a different time because the users can be in different attention modes during these time periods.

With further reference to FIG. 1, another example of a value the conversational context detection and management module 111 can be configured to compute the conversational context such as a few conversational stages including introduction, greeting, continuation, switching topics, conclusion, repair of a miscommunication due to speaker or hearer, facing failure in solving problems at hand, or the like. In one example, this information can be tracked and updated with input from dialog manager module 113.

With further reference to FIG. 1, the dialog manager module 113 can be configured to communicate with the response generation module 115. In one example, the dialog manager module 113 can provide the response generation module 115 information such as content information that the user requested and the context information. In one example, based on the information about the user obtained from the different modules 101, 103, 105, 107, 109, 111, and 113 and the context information, the response generation module 115 decides what expressions to construct by selecting different wordings with different prosodic marks.

With further reference to FIG. 1, the response generation module 115 can be configured to use multiple aspects of human communication to design the responses of the system 100. In one example, the multiple aspects can include system 100 personality, user (conversational partner), context, and language genre. In another example, in addition to the content selection as the input to the response generation module 115, the responses from the system 100 can be generated using an exemplary method. The exemplary method for generating responses from the system 100 can include selecting proper wording. In one example, the words and expressions can be dynamically or statically selected conditioned on the user's state and context as described herein. Examples of lexical and expression variations can include, but are not limited to, number of syllables, length variations of different pronunciations with full or shortened forms, difficulty degree to pronounce by common people, confusability with other words, humorous or formal or the like. The exemplary method to generating a response can further include selecting a proper tone. In one example, the words and phrases can be marked, including stressing a phrase, lengthening or shortening certain vowel or consonant, rising or falling at the end of an utterance. The exemplary method to generating a response can further include selecting a volume level. In one example, the system 100 can be configured to control a proper speech output volume given the acoustic environment, such as loud noisy and quiet, and the speaker's or user's volume, such as weak, energetic, or normal.

With further reference to FIG. 1, the system 100 can further include a database 119 where the modules 101, 103, 105, 107, 109, 111, 113, 115 can construct and maintain knowledge bases. The knowledge bases can be used in the system 100 to support response generation by the response generation module 115. The databases can be located locally in the system 100 or can engage with the system 100 from an external location. In one example, the knowledge bases can include a rich word dictionary with lexical information of duration, formality, and intelligibility. A rich word dictionary can include information such as number of syllables, length variations of different pronunciations with full or shortened forms, difficulty degree to pronounce by common people, confusability with other words. The knowledge bases can also include a rich expression dictionary. In one example, the rich expression dictionary can include expressions conditioned with the user and context information disclosed herein, expression frequencies occurred as the output from the system, indication of whether the expression is recognized by the speech recognizer, usage, and conditions including what situations and to whom the expression is used. Example of conditions as disclosed herein include, but are not limited to, age, gender, profession, relationship, acquaintance, emotion indicator, personality indicator, interaction setting, response urgency or pace, operation time, conversational context, or the like. Examples of conditions may further include, but are not limited to, the ontological relationship among all the previously mentioned aspects, which may be hierarchical, scalar, categorical, and/or binary, or the like. Multiple phrases or terms can be attached to these conditions, such as for family members, one may use parent, father, mother, boy, kid, etc.

Figure 2:
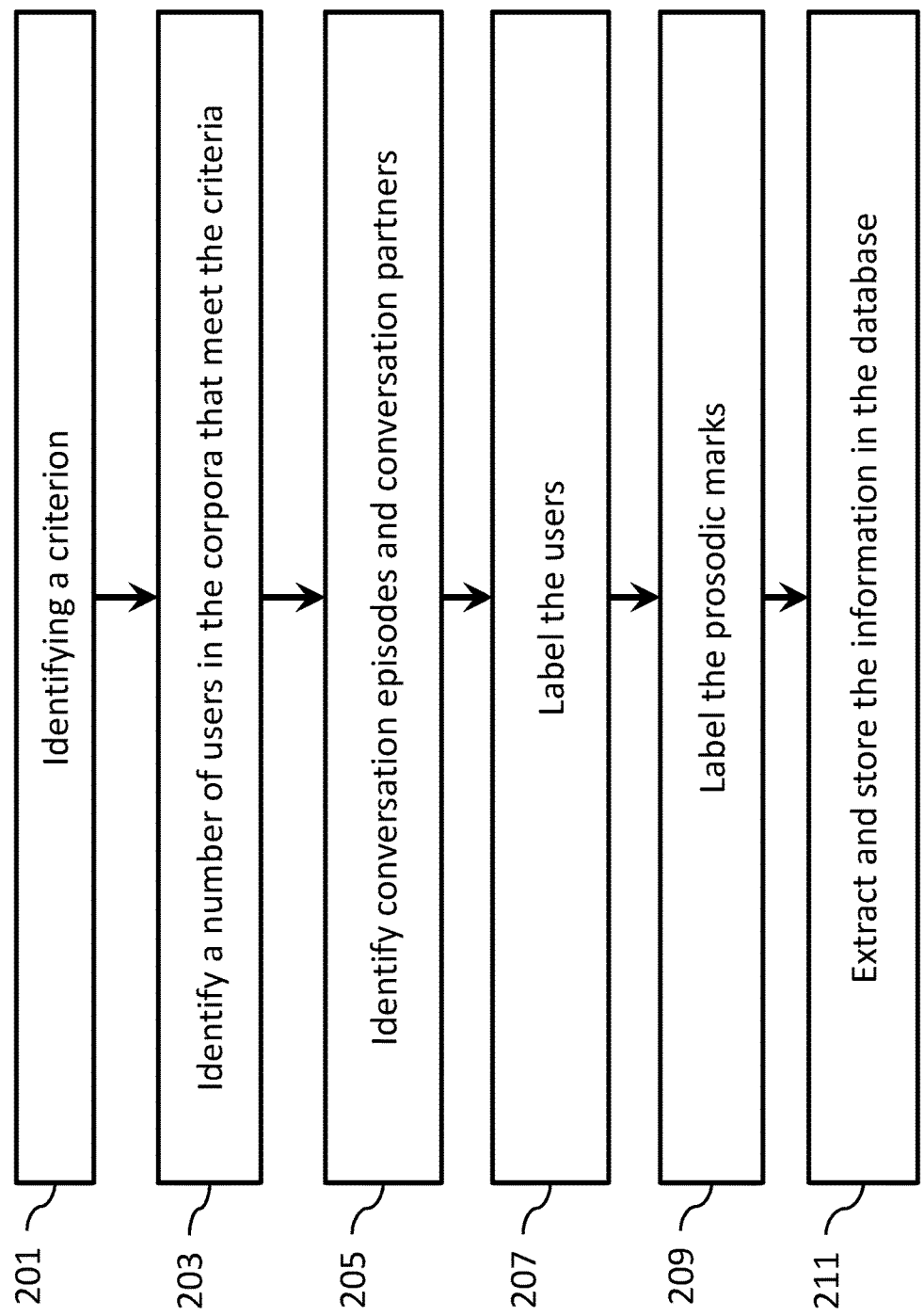
FIG. 2 illustrates an exemplary method for building the knowledge bases for the database according to the disclosure in the system of FIG. 1.

FIG. 2 illustrates an exemplary method for building the knowledge bases for the database 119 in the system 100. In one example, the method can be used to obtain conditions together with word level and expression level information. In another example, the method can use a semi-automatic approach to label data corpora with the conditions described herein. These corpora can include, but are not limited to, online tweet corpora or discussion forum in related domains, telephony conversational data corpora, such as Switchboard from LDC, and movie transcription corpora of different conversations or dialogs. In another example, speakers or users and their communication partners can be identified with a specific user id (such as specific user ids used in twitter or switchboard), or characters in movie. The specific user ids can be used for annotation of the corpora.

With further reference to FIG. 2, the exemplary method can include first identifying a criterion (Step 201). This can involve selecting one or more sets of criteria. Identifying the criterion can involve selecting one or more system personalities together with associated sets of criteria (Step 201). The criteria can be personality criteria. This identification or selection can be performed manually for a small set of the data and use one or more machine learning algorithms to train statistical models for classification candidates into speakers or non-speakers for selection or identification (Step 201). Examples of machine learning algorithms include, but not limited to, support vector machine (SVM), decision tree, maximum entropy (ME), neural networks, among others, or the like. The method can further include identifying a number of users, for example number of user ids or characters, in the corpora that meet the criteria (Step 203). The exemplary method can further include identifying the conversation episodes and conversation partners (Step 205). After identifying the conversation episodes and conversation partners, the method can involve or engage these identified people with the selected personality (reflecting the system personality) (Step 205). The exemplary method can further include labelling the users such as the conversational partners into the user groups such as middle age, female, adult, talking to another family member, or the like, as well as how familiar the conversation partners are (Step 207). This can further include involving their conversations with corresponding context (e.g., family setting, medium pace) (Step 207). The method can further include labelling the prosodic marks. In one example, the prosodic marks can be labelled with, among other things, a speech recognizer for phone duration, speaking rate, hesitation, repeats, hesitation, revision, or interrupting; emotion detector for happy, angry, sad, or neutral mood; speaker energy detection for a loud or soft speaker (Step 209). The method can further include extracting and storing the information in the database 119, for example into a rich word dictionary and the rich expression dictionary in the database 119 (Step 211).

In one embodiment, the disclosed subject matter can enable the system 100 to use multiple aspects of human communication labeled in the database 119 to design the responses of the system 100. In some embodiments other external sources and other conditions can be used in the system 100. In other embodiments, these external sources and other conditions are be used together with word level and expression level information in the system 100.

In another embodiment, the disclosed subject matter can enable to system 100 to generate responses using word choices, expression selection in real life, prosody or emotion in sentences, frequencies of such response in dialog systems, context-sensitive and personalized. In one exemplary embodiment databases 119 can also come from different corpora on different subjects such twitter, discussion forum, LDC conversational corpus, YouTube video, movies. In one exemplary embodiment, different user related aspects such as age, gender, profession, mood, relationship, familiarity, context related aspects such as conversational setting, urgency, time, state, and genre-related aspects can be integrated in the system 100. The disclosed subject matter provides an example of modules that detect and track these states. The disclosed subject matter also provides the construction of knowledge bases that can be used by the system 100.

In one exemplary embodiment, the disclosed subject matter can provide to the users a personalized context-sensitive response system 100 with different personalities for uses in home, office, enterprise, or mobile applications.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

What is claimed is:
1. A system comprising:
a processor;
a dialog manager configured to receive input from a user, the received input being the user's speech;
a user category classification and detection module configured to use the processor to identify categories for the user with reference to the received input;
a user mood detection and tracking module configured to use the processor to identify a mood of the user with reference to the received input;
a user physical and mind state and energy level detection module configured to use the processor to identify at least one of a physical status and a mental status of the user with reference to the received input;
a user acquaintance module configured to use the processor to identify an acquaintance status of the user with reference to the received input;
a user personality detection and tracking module configured to use the processor to identify a personality status of the user with reference to the received input;
a conversational context detection and management module configured to use the processor to identify a conversational context of the received input; and
a response generation module configured to use the processor to build a knowledge base and generate a response for the user with reference to the received input and to vocalize the response for the user, the categories for the user, the mood of the user, the mental status of the user, the acquaintance status of the user, the personality status of the user, and the conversational context of the received input,
wherein the user category classification and detection module is further configured to associate at least one of an age, a gender, a profession and a relationship with the user with reference to at least one of a voice characteristic of the user, at least one image of the user, and at least one video of the user, and
wherein the response generation module is configured to assign a voice type for vocalizing the response and to select at least one voice characteristic for the voice type based at least in part on the at least one of the age, the gender, the profession, and the relationship associated with the user.

2. The system of concept 1, further comprising:
a database, the knowledge base stored in the database.

3. The system of concept 1, wherein the knowledge base includes at least one of a rich word dictionary and a rich expression dictionary.

4. The system of concept 1, wherein the response generation module is further configured to generate the response by:
selecting words with reference to the received input, the categories for the user, the mood of the user, the mental status of the user, the acquaintance status of the user, the personality status of the user, and the conversational context of the received input;
selecting a tone based on the received input, the categories for the user, the mood of the user, the mental status of the user, the acquaintance status of the user, the personality status of the user, and the conversational context of the received input; and
selecting a volume level based on the received input, the categories for the user, the mood of the user, the mental status of the user, the acquaintance status of the user, the personality status of the user, and the conversational context of the received input.

5. The system of claim 1, wherein the user mood detection and tracking module is further configured to associate at least one current mood with a user, the at least one current mood identified with reference to at least one of a current voice characteristic of the user, a current facial expression of the user in at least one image of the user, and a current facial expression of the user in at least one video of the user.

6. The system of claim 1, wherein the user physical and mind state and energy level detection module is further configured to associate at least one of a physical state and a mental state with the user with reference to at least one of a current tone of voice of the user, a current voice pace of the user, a time of day, a user sleep pattern, and the received input.

7. The system of claim 1, wherein:
the acquaintance status is indicative of a familiarity of the user with the system, and
the user acquaintance module is further configured to identify an acquaintance status for the user with reference to data indicating at least one of whether the user has used the system, a number of times the user has used the system, a frequency of user interaction with the system, and an identification of features of the system previously used by the user.

8. The system of claim 1, wherein the user personality detection and tracking module is further configured to monitor interactions between the user and the system over time and to identify the personality status with reference to a voice characteristic of the user on a day-to-day basis and over time, the voice characteristic including at least one of tone of voice, voice pace, words used, features of the system used, number of interactions with the system, and length of interactions with the system.

9. The system of claim 1, wherein the conversational context detection and management module is further configured to identify the conversational context with reference to at least one of an interaction setting, tone of voice of the user, urgency level of a voice of the user, and prior interactions with the user.

10. A method of operating a dialog system configured to interact with a user using spoken dialog, the method comprising:
receiving voice input into the system via a voice detection system, the voice input indicative of a spoken statement spoken of a user;
using a user category classification and detection module to:
determine at least one voice characteristic of the voice input; and
identify at least one of an age, a gender, and an identity of the user with reference to the at least one voice characteristic;
using a user mood detection and tracking module to associate at least one mood with the user with reference to the at least one voice characteristic;
using a physical and mind state and energy level detection module to associate at least one of a physical state and a mental state with the user with reference to the at least one voice characteristic;
using a user acquaintance module to associate an acquaintance status with the user with reference to the at least one voice characteristic and to a history of prior interaction of the user with the system;
using a user personality detection and tracking module to associate a personality status with the user with reference to the at least one voice characteristic and to the history;
using a conversational context detection and management module to associate a conversational context with the voice input with reference to the at least one voice characteristic;
generating a response to the spoken statement and assigning a voice type to the response, the voice type having at least one voice characteristic that is selected with reference to the category, the mood, the at least one of physical and mental state, the personality, and the conversational context associated with the user; and using the system to vocalize the response with the assigned voice type having the corresponding voice characteristics, wherein the user category classification and detection module is further configured to associate at least one of an age, a gender, a profession and a relationship with the user with reference to at least one of a voice characteristic of the user, at least one image of the user, and at least one video of the user, and wherein the response generation module is configured to assign a voice type for vocalizing the response and to select at least one voice characteristic for the voice type based at least in part on at least one of the age, the gender, the profession, and the relationship associated with the user.

* * * * *